(12) United States Patent
Forster

(10) Patent No.: US 10,372,951 B2
(45) Date of Patent: Aug. 6, 2019

(54) TUNNEL FOR HIGH DENSITY PACKAGED GOODS

(71) Applicant: Avery Dennison Retail Information Services, LLC, Westborough, MA (US)

(72) Inventor: Ian J. Forster, Chelmsford (GB)

(73) Assignee: AVERY DENNISON RETAIL INFORMATION SERVICES, LLC, Mentor, OH (US)

( * ) Notice: Subject to any disclaimer, the term of this patent is extended or adjusted under 35 U.S.C. 154(b) by 0 days.

(21) Appl. No.: 15/366,775

(22) Filed: Dec. 1, 2016

(65) Prior Publication Data
US 2018/0157879 A1   Jun. 7, 2018

(51) Int. Cl.
G06K 7/10   (2006.01)
G06K 7/00   (2006.01)

(52) U.S. Cl.
CPC ....... G06K 7/10445 (2013.01); G06K 7/0008 (2013.01)

(58) Field of Classification Search
CPC ................................................ G06K 7/10445
See application file for complete search history.

(56) References Cited

U.S. PATENT DOCUMENTS

| | | | |
|---|---|---|---|
| 7,589,617 B2 | 9/2009 | McQuade | |
| 7,667,591 B2 | 2/2010 | Olsen, III et al. | |
| 9,189,662 B2 | 11/2015 | Zogg et al. | |
| 2006/0086790 A1* | 4/2006 | Sloan | G06K 7/10445 235/384 |
| 2011/0017570 A1 | 1/2011 | Graf | |
| 2012/0058835 A1* | 3/2012 | Luciano, Jr. | G01S 19/39 473/192 |
| 2012/0075074 A1 | 3/2012 | Frosch et al. | |
| 2014/0027511 A1 | 1/2014 | Plocher et al. | |
| 2014/0339297 A1* | 11/2014 | Bremer | G06K 7/10445 235/375 |
| 2015/0353292 A1 | 12/2015 | Roth | |

FOREIGN PATENT DOCUMENTS

JP   2006252181   9/2006
WO   2006114812   11/2006

OTHER PUBLICATIONS

International Search Report and Written Opinion of ISA/EPO Prepared for PCT/US2017/063669 dated Feb. 21, 2018.

* cited by examiner

*Primary Examiner* — Ryan W Sherwin
(74) *Attorney, Agent, or Firm* — Avery Dennison Retail Information Services, LLC

(57) ABSTRACT

A read tunnel device is disclosed for scanning a plurality of cartons of high density packaged items moving through an enclosure via a conveyor belt. The read tunnel device is positioned over a section of the conveyor belt, such that the plurality of cartons on the conveyor belt pass directly through the read tunnel device. Further, the cartons are induced to tumble as they transit through the read tunnel device in one or more dimensions, the tumbling changes arrangement of the items within the cartons and also changes read direction with respect to the antenna in the enclosure. For example, the read tunnel device can comprise a tube angled down from the conveyor belt so a carton will transit down the tube using the force of gravity. Or, a mechanical structure such as mechanical flippers can pick up the carton and rotate it in controlled increments.

14 Claims, 4 Drawing Sheets

TUNNEL FOR HIGH DENSITY PACKAGED GOODS

BACKGROUND

The present invention relates generally to improving the performance of a radio frequency identification (RFID) tunnel reader with boxes of items, such as clothing, packed close together. More particularly, the present disclosure relates to a read tunnel device for scanning a plurality of cartons of high density packaged items moving through an enclosure via a conveyor belt.

Radio frequency identification (RFID) tags are electronic devices that may be affixed to items whose presence is to be detected and/or monitored. The presence of an RFID tag, and therefore the presence of the item to which the RFID tag is affixed, may be checked and monitored by devices known as "readers" or "reader panels." Readers typically transmit radio frequency signals to which the RFID tags respond. Each RFID tag can store a unique identification number. The RFID tags respond to reader-transmitted signals by providing their identification number and additional information stored on the RFID tag based on a reader command to enable the reader to determine an identification and characteristics of an item.

Currently, the need for the ability to scan RFID transponders in automated environments has caused the creation of a scanning tunnel or enclosure (i.e., a RFID dynamic tunnel scanner). Different manufacturers may take different approaches to scanning these transponders. Typically, an enclosure uses a combination of absorber material to attenuate radio frequency energy and a read chamber central to the enclosure that projects a read zone. Thus, the read chamber uses an absorber method that directs the main flow of energy normal to the antenna plain, creating the read zone.

Furthermore, the main challenge in utilizing a RFID dynamic tunnel scanner is the inability to capture all of the inlay/transponders applied to each individual item within a given carton. Specifically, spacing between cartons, speed of the conveyor equipment, power supplied by the RFID reader, among other parameters are all very difficult to manage to achieve a 100% read rate without creating over-read conditions whereby inlays from adjacent cartons upstream or downstream of the intended carton are read as well. The other end of the spectrum of course is not reading all of the tags properly.

Furthermore, the performance of RFID tags in a carton can be effected by the properties of the product, for example, presence of metal items and their dielectric properties. Another significant factor is proximity between tags, which can cause reduction of performance. Generally, the worst case scenario is when an array of RFID tags inside a carton are in a relatively fixed position with respect to each other; then some RFID tags may have greater levels of degradation of performance than others and may not be read in transit through a scanning tunnel.

The present invention discloses a read tunnel device that improves the readability of items in a carton passing through a tunnel reader. The device both changes the relative arrangement of the RFID tags and the position of the carton with respect to the read antenna dynamically as the carton transits the read zone. The device induces a rotation of the carton in the vertical axis (or the other axis) as it travels through the reader.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject matter disclosed and claimed herein, in one aspect thereof, comprises a read tunnel device for scanning a plurality of cartons of high density packaged items moving through an enclosure via a conveyor belt. The read tunnel device is positioned over a section of the conveyor belt, such that the plurality of cartons on the conveyor belt pass directly through the read tunnel device. The read tunnel device comprises a read chamber, a radio frequency identification (RFID) scanning enclosure, and at least one antenna positioned within the read chamber which projects a read zone. The RFID tags on the cartons are energized and read in the read zone by a reader and signals are transmitted back to the reader, identifying the cartons and transmitting information that the RFID tags contain. Further, the cartons are induced to tumble as they transit through the read tunnel device in one or more dimensions, the tumbling changes arrangement of the items within the cartons and also changes read direction with respect to the at least one antenna in the enclosure.

In a preferred embodiment, the read tunnel device comprises a tube angled down from the conveyor belt so a carton will transit down the tube using the force of gravity. Additionally, the tube comprises helical ridges inside it and the tube rotates clockwise and/or counter-clockwise tumbling the carton down the tube. Further, the tube can be RF transparent such that the carton is scanned during transit of the carton through the tube, or the tube comprises apertures that allow RFID readers to scan the carton to read the RFID tags attached to the items.

In another embodiment, the read tunnel device comprises a mechanical structure that picks up the plurality of cartons and transited the cartons through the read chamber. The mechanical structure is utilized to rotate and move the plurality of cartons through the enclosure. The mechanical structure can be a robotic hand that comprises multiple degrees of freedom and rotates and moves the plurality of cartons. The robotic hand can apply translation and rotation in any axis to the plurality of cartons. Or, the mechanical structure can be a set of mechanical flippers that are used to rotate the carton in controlled increments.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
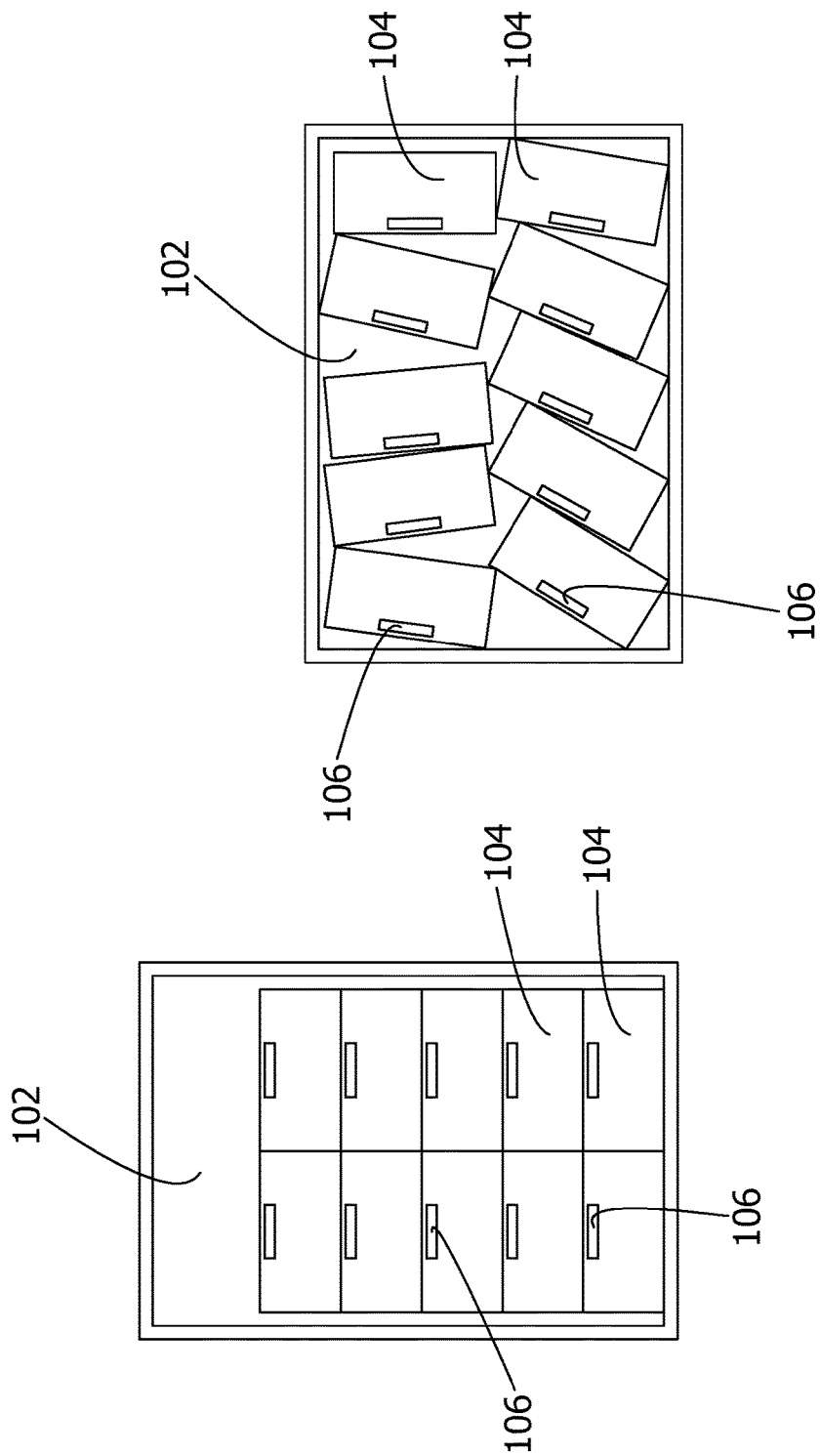
FIG. 1A illustrates a top perspective view of a carton before it transits through the read tunnel device in accordance with the disclosed architecture.
FIG. 1B illustrates a top perspective view of the carton after it transits through the read tunnel device in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

The present invention discloses a read tunnel device for scanning a plurality of cartons of high density packaged items moving through an enclosure via a conveyor belt. The read tunnel device is positioned over a section of the conveyor belt, such that the plurality of cartons on the conveyor belt pass directly through the read tunnel device. Further, the cartons are induced to tumble as they transit through the read tunnel device in one or more dimensions, the tumbling changes arrangement of the items within the cartons and also changes read direction with respect to the antenna in the enclosure. For example, the read tunnel device can comprise a tube angled down from the conveyor belt so a carton will transit down the tube using the force of gravity. Or, a mechanical structure such as mechanical flippers can pick up the carton and rotate it in controlled increments.

The read tunnel device 100 improves the readability of items in a carton or box passing through an enclosure. The read tunnel device 100 both changes the relative arrangement of RFID tags on the items in the carton and the position of the carton with respect to the read antenna dynamically as the carton transits through the read zone. Specifically, the read tunnel device 100 induces rotation of the carton in the vertical axis as it travels through the read tunnel device 100, and can also rotate in the other axis as well, depending on a user's wants and needs. The rotation causes the fixed relationship in a carton between items to change, assuming that the items are not completely inflexible and there is some space in the carton, that is the items are compressed to a high.

Referring initially to the drawings, FIGS. 1A-B illustrate a carton 102 before it transits through the read tunnel device 100. Initially, items 104 in the carton 102, such as pairs of socks, are in the carton 102 in some initial fixed array, however, during transit of the carton 102 through the read tunnel device 100 a 90 degree rotation is applied to the carton 102. As the direction of vertical has not changed, the items 104 will slide, deform, and make other alterations to the previously fixed arrangement, improving the readability of the RFID tags 106 in the carton 102.

Figure 2:
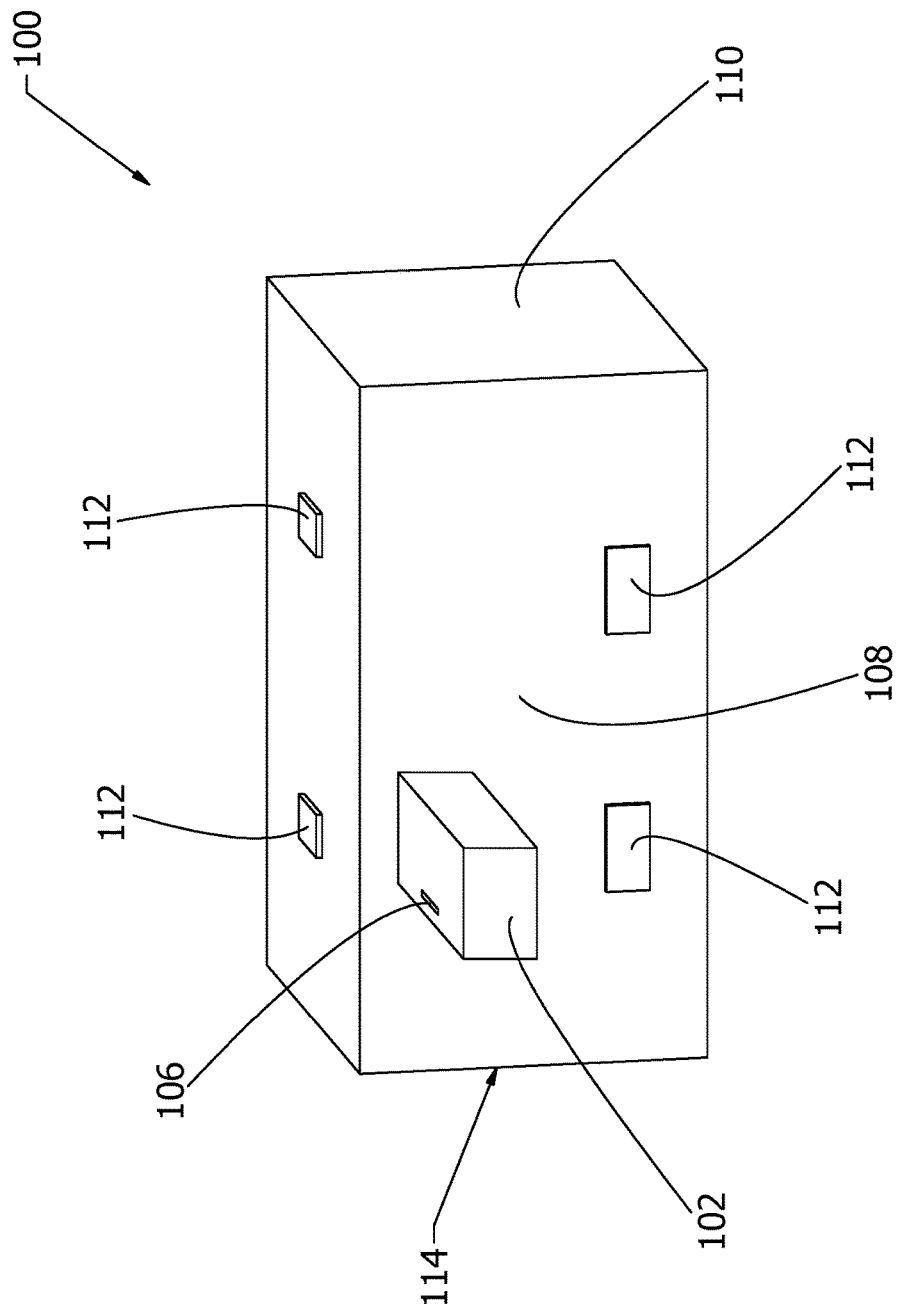
FIG. 2 illustrates a perspective view of the read tunnel device and transit of the carton through the device in accordance with the disclosed architecture.

Specifically, as shown in FIG. 2, the read tunnel device 100 comprises both a read chamber (or zone) 108 and a radio frequency identification (RFID) scanning enclosure 110 which provides a means of reading a plurality of cartons 102 moving through the enclosure 110. Typically the plurality of cartons 102 move through the enclosure 110 via a conveyor belt (not shown) or other transport mechanism as is known in the art. The read tunnel device 100 is positioned over a section of the conveyor belt, such that the plurality of cartons 102 on the conveyor belt pass directly through the read tunnel device 100.

Once the plurality of cartons 102 enters the enclosure 110 via the conveyor belt, an antenna 112 projects radio frequency energy to create a read zone 108 for the reader. RFID tags 106 (or transponders) on the cartons 102 are energized and read in the read zone 108 by the reader and signals are transmitted back to the reader, identifying the carton 102 and transmitting any other information the tags 106 might contain. One of ordinary skill in the art will appreciate that using the enclosure 110 to read RFID tags 106 on cartons 102 is merely one possible example and the same system may be used for any application that involves a reading of any group of items that are streaming through a particular location. Thus, although the term "carton" is used throughout the present disclosure for exemplary purposes, the term "carton" may be any single item or a group of items.

The read tunnel device 100 can be any suitable size, shape, and configuration as is known in the art without affecting the overall concept of the invention. One of ordinary skill in the art will appreciate that the interior and/or exterior shape of the enclosure 110 as shown in FIG. 2 is for illustrative purposes only and many other shapes of the enclosure 110, such as a cylinder or a rectangle, are well within the, scope of the present disclosure. Although dimensions of the enclosure 110 (i.e., length, width, and height) are important design parameters for good performance, the enclosure 110 may be any shape that ensures an optimal read zone toward a carton 102 within the enclosure 110.

Further, the read tunnel device 100 comprises a tunnel throat (or opening) 114 wherein cartons 102 enter the enclosure 110 via the conveyor belt. The tunnel opening 114 is designed to deal with motility and movement of the conveyor belt the products or cartons 102 are traveling on. For example, the tunnel opening can have a throat capacity of approximately 30".

Furthermore, the scanning enclosure 110 projects a read zone 108 via at least one antenna 112. Specifically, a combination of different antenna sets are used which reduces the need for a bulky read chamber. Further, the antennas 112 are in-line with the flow of the conveyor, which allows the read chamber (or zone) 108 to read a large variety of inlays, and at the same configuration settings. Any suitable number of antennas 112 and/or combination of different antenna sets can be used as is known in the art, depending on the wants and needs of a user and the configuration of the enclosure 110. Further, any suitable type of antenna can be used as is known in the art, such as a wide angle antenna, etc., depending on the wants and needs of a user and the configuration of the enclosure 110.

As shown in FIG. 2, the read tunnel device 100 is implemented inside the enclosure 110. Specifically, the cartons 102 are induced to tumble as they transit through the read tunnel device 100 in one or more dimensions, changing the arrangement of the items 104 within the cartons 102 but also changing the read direction with respect to the antennas 112 in the enclosure 110. By logging all of the RFID tags 106 read by all of the antennas 112 as the cartons 102 progress, the probability of a successful 100% read of all RFID tags 106 is improved. Further, rotation or movement of the carton 102 can occur in multiple ways, such as a slanted tube, a mechanical structure for picking up the cartons, etc., or any other suitable means for rotating the cartons 102 as is known in the art.

Figure 3:
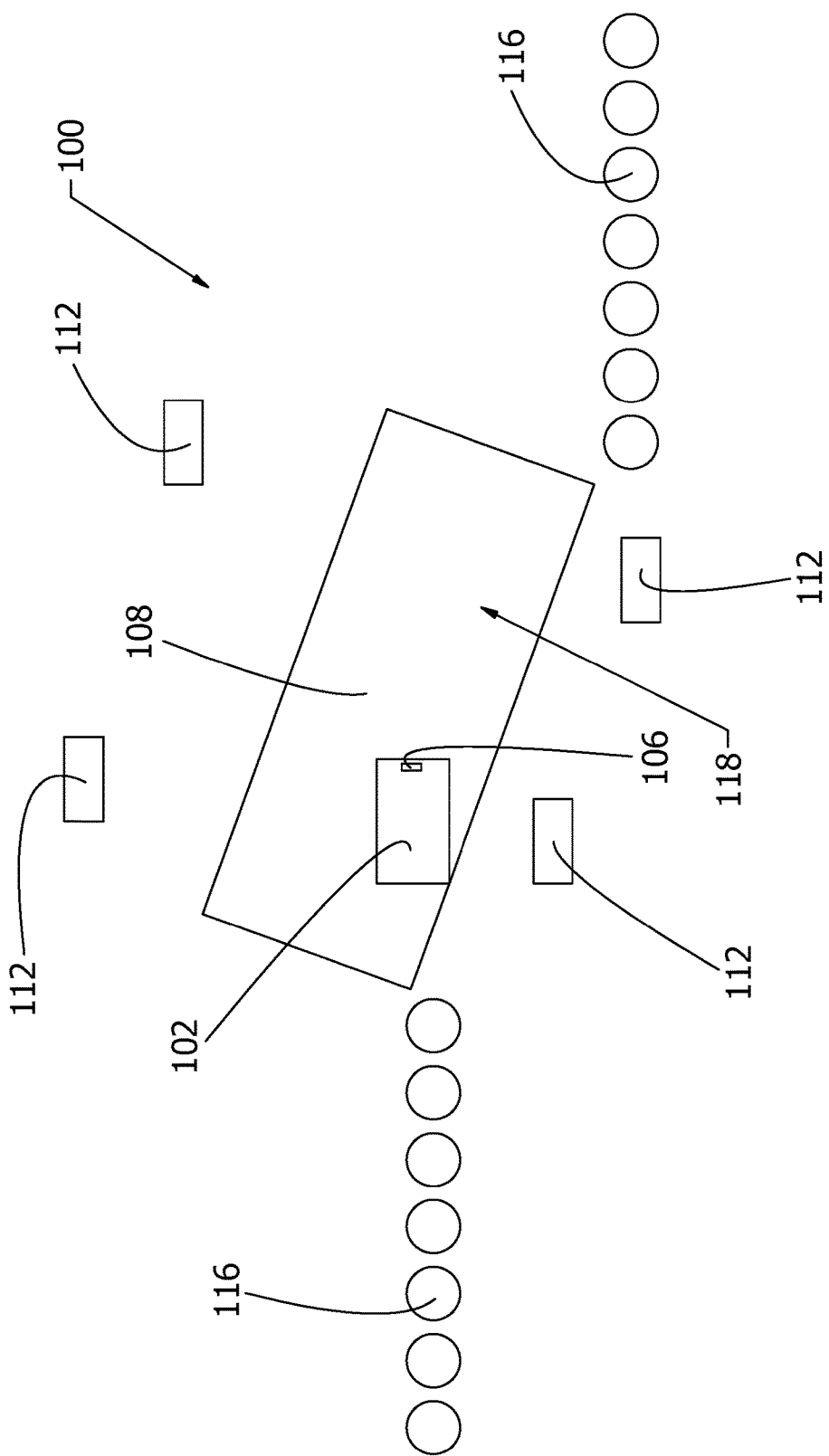
FIG. 3 illustrates a perspective view of another embodiment of the read tunnel device wherein the device utilizes a sloped tube in accordance with the disclosed architecture.

FIG. 3 discloses an exemplary embodiment of an implementation of a scheme for inducing movement of the plurality of cartons 102 through the read tunnel device 100. Specifically, the embodiment induces tumbling of the cartons 102 through the read tunnel device 100. The cartons 102 are delivered from a standard conveyor 116 into a tube 118. The tube 118 has helical ridges inside it and rotates clockwise and/or counter-clockwise. The tube 118 is also angled down, so a carton 102 will tend to transit down the tube 118 using the force of gravity and the helical ridges gripping the carton 102. During the transit of the carton 102 through the tunnel tube 118, which is RF transparent or conductive with suitable apertures for antennas 112, the carton 102 enters the read zone 108 where RFID readers scan the carton 102 to read the RFID tags 106 attached to the items.

Figure 4:
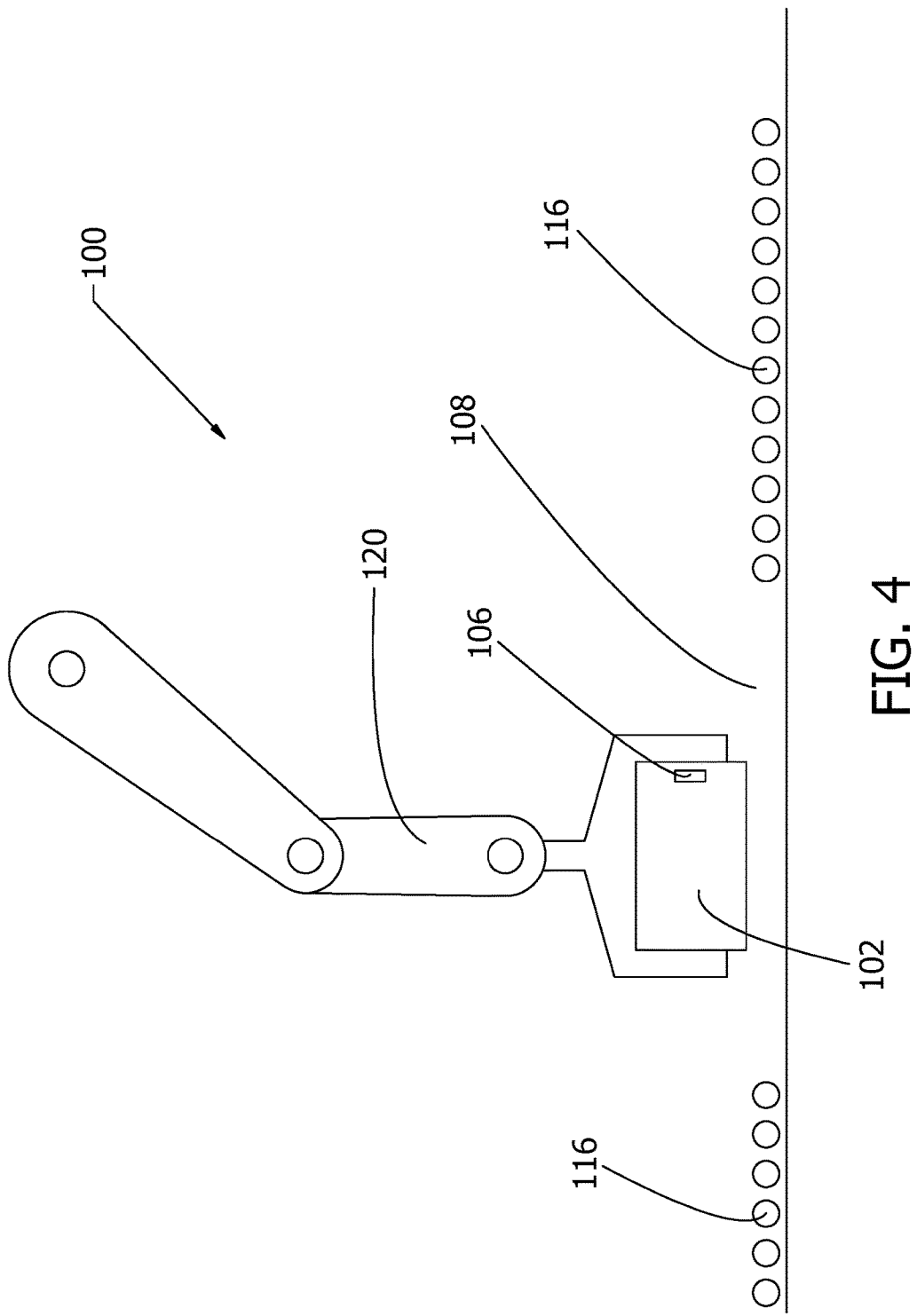
FIG. 4 illustrates a perspective view of another embodiment of the read tunnel device wherein the device utilizes a robotic structure to grip and rotate the carton in accordance with the disclosed architecture.

Other method of rotating the cartons 102 can be used, for example, mechanical flippers can be used to rotate the carton 102 in controlled increments, or the carton 102 can be gripped in a frame or robotic structure 120 that itself can rotate and apply other translations to improve readability, as shown in FIG. 4.

FIG. 4 discloses an exemplary embodiment of an implementation of inducing movement of the plurality of cartons 102 through the read tunnel device 100. In this embodiment, the carton 102 is picked up by a mechanical structure and transited through the read zone. The mechanical structure is typically a robotic hand/claw system 120 with multiple degrees of freedom. The robotic hand/claw system 120 can be any suitable robotic hand/claw as is known in the art. The robotic hand/claw system 120 can rotate and apply other translations/movements to the carton 102. Specifically, the structure can apply translation and rotation in any axis to the carton 102, greatly increasing the probability of a read event. If the number of items in the carton 102 is known, the rotation/translation process can be terminated when a 100% read is achieved and the carton 102 is rapidly moved from input to output, increasing throughput.

The cartons 102 are delivered from a standard conveyor 116 to the robotic hand/claw system 120. The robotic hand/claw system 120 picks up the cartons 102 and rotates the cartons 102 along any axis. The robotic hand/claw system 120 then places the carton 102 back on the conveyor 116 to transit through a read zone 108, wherein RFID readers are scanning the carton 102 to read the RFID tags 106 attached to the items.

What has been described above includes examples of the claimed subjected components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A read tunnel device for scanning a plurality of cartons of high density packaged items moving through an enclosure, comprising:
   a read chamber; and
   a radio frequency identification (RFID) scanning enclosure for reading the plurality of cartons; and
   a conveyor belt for moving the plurality of cartons through the enclosure; and
   at least one antenna positioned within the read chamber; and
   wherein the at least one antenna projects radio frequency energy to read RFID tags attached to the items; and
   a tube comprising apertures that allow RFID readers to scan the plurality of cartons to read the RFID tags attached to the items.

2. The read tunnel device of claim 1, wherein the read tunnel device is positioned over a section of the conveyor belt, such that the plurality of cartons on the conveyor belt pass directly through the read tunnel device.

3. The read tunnel device of claim 2, wherein the RFID tags on the items are energized and read in the read chamber by a reader and signals are transmitted back to the reader, identifying the cartons and transmitting information that the RFID tags contain.

4. The read tunnel device of claim 3, wherein the cartons are induced to tumble as they transit through the read tunnel device in one or more dimensions, changing arrangement of the items within the cartons but also changing read direction with respect to the at least one antenna in the enclosure.

5. The read tunnel device of claim 4, wherein the enclosure comprises a tube angled down from the conveyor belt so a carton will transit down the tube using force of gravity.

6. The read tunnel device of claim 5, wherein the tube comprises helical ridges inside it and rotates clockwise or counter-clockwise.

7. The read tunnel device of claim 6, wherein the tube is RF transparent such that the carton is scanned during transit of the carton through the tube.

8. The read tunnel device of claim 4, wherein mechanical flippers are used to rotate the carton in controlled increments.

9. The read tunnel device of claim 4, wherein a robotic hand is utilized to rotate and move the cartons.

10. The read tunnel device of claim 9, wherein the robotic hand comprises multiple degrees of freedom.

11. The read tunnel device of claim 10, wherein the robotic hand can apply translation and rotation in any axis to the carton.

12. A read tunnel device for scanning a plurality of cartons of high density packaged items moving through an enclosure, comprising:
    a read chamber; and
    a radio frequency identification (RFID) scanning enclosure that comprises an angled tube for reading the plurality of cartons; and
    a conveyor belt for moving the plurality of cartons through the enclosure; and
    at least one antenna positioned within the read chamber; and
    wherein the at least one antenna projects radio frequency energy to read RFID tags attached to the items; and
    wherein the plurality of cartons are induced to tumble as they transit through the read tunnel device in one or more dimensions, changing arrangement of the items within the plurality of cartons but also changing read direction with respect to the at least one antenna in the enclosure; and wherein the angled tube is angled down from the conveyor belt so the plurality of cartons will transit down the tube using force of gravity; and
    wherein the tube comprises apertures that allow RFID readers to scan the plurality of cartons to read the RFID tags attached to the items.

13. The read tunnel device of claim 12, wherein the tube comprises helical ridges inside it and rotates clockwise or counter-clockwise.

14. The read tunnel device of claim 13, wherein the tube is RF transparent such that the plurality of cartons are scanned during transit of the plurality of cartons through the tube.

* * * * *